(12) United States Patent
Yamaguchi

(10) Patent No.: US 7,440,144 B2
(45) Date of Patent: Oct. 21, 2008

(54) IMAGE INPUT/OUTPUT APPARATUS

(75) Inventor: Yukuo Yamaguchi, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 600 days.

(21) Appl. No.: 11/263,348

(22) Filed: Oct. 31, 2005

(65) Prior Publication Data

US 2006/0092194 A1   May 4, 2006

(30) Foreign Application Priority Data

Nov. 1, 2004   (JP) ............................ 2004-318140

(51) Int. Cl.
*B41J 3/00* (2006.01)
(52) U.S. Cl. ............... 358/406; 347/7; 347/2; 250/573; 250/574; 250/576; 358/529
(58) Field of Classification Search ............ 358/406
See application file for complete search history.

(56) References Cited

U.S. PATENT DOCUMENTS 5,434,603 A * 7/1995 Hunt .......................... 347/7
5,616,929 A * 4/1997 Hara ........................... 250/573
2002/0041407 A1 * 4/2002 Takahashi et al. ............ 358/529
2003/0081018 A1 * 5/2003 Kinsley et al. ................ 347/2

FOREIGN PATENT DOCUMENTS

JP        2004-235831 A    8/2004

\* cited by examiner

*Primary Examiner*—Mark A Robinson
*Assistant Examiner*—David L Suazo
(74) *Attorney, Agent, or Firm*—Canon USA Inc I.P. Div

(57) ABSTRACT

An image input/output apparatus having a scanner unit disposed at an upper stage of an apparatus body and a liquid jet recording unit installed at a lower stage of the apparatus body includes a window which light passes through between the scanner unit and the liquid jet recording unit; an exposure controlling unit configured to control linear irradiation by a light source which illuminates an original platen when a maintenance mode of the recording unit is selected; and a luminous flux irradiation unit configured to irradiate a periphery of a liquid jet recording head in the above liquid jet recording unit with a luminous flux emitted from the light source passing through the window.

14 Claims, 16 Drawing Sheets

IMAGE INPUT/OUTPUT APPARATUS

BACKGROUND OF THE INVENTION

1. Field of the Invention

The present invention relates to an image input/output apparatus having an image reading section for converting light from an original into an electric signal and reading the same as the image and a liquid jet recording unit for recording the image by jetting a droplet onto a recording medium based on image data read by the image reading section.

2. Description of the Related Art

An image reading apparatus which reads an image of an original by moving an image reading section in parallel to a surface of the original is conventionally known. The image reading section includes an imaging section, which is provided with a reducing optical system of a mirror moving scanning type, a contact type image sensor, and the like.

For example, in a case of an image reading apparatus of a flat bed type, a transparent original platen on which the original is placed is provided in an upper portion of a housing. The image reading section, which is movable in parallel to the original platen, is provided inside the housing. A light source and an imaging unit are mounted on the original image reading section. Illuminating light from the light source is reflected on the surface of the original placed on the original platen and is converged on the imaging unit by a condensing lens.

Besides, a type of the image input/output apparatus is known, which is configured such that the image reading section of the image reading apparatus is disposed above the apparatus body as a scanner unit. A liquid jet recording unit disposed below the scanner unit jets the droplet from a discharge port based on the image signal obtained by a reading operation of the scanner unit and the image signal from external devices, and forms the image on the recording unit.

In the liquid jet recording unit of the image input/output apparatus, when the liquid jet recording head jets the droplet toward the recording medium to carry out an image recording, the droplet splashed on a surface of recording liquid is stirred up within the liquid jet recording unit to generate so-called mist. However, the mist arises in a very small amount though the mist adheres to each portion forming the liquid jet recording unit. Therefore, the mist does not cause malfunction of the apparatus.

In addition, during a print waiting mode of the liquid jet recording head or when the power supply of the apparatus body is turned off, the periphery of the discharge port of the liquid jet recording head is covered with a cap member (hereinafter referred to as capping). Accordingly, a situation in which the recording liquid cannot be discharged due to thickening and the like which comes from evaporation of recording liquid solvent stored in the inside of the liquid jet recording head, is prevented from happening.

Thereby, an initial position at which the liquid jet recording head is capped and a maintenance region in which the recording liquid tank cartridge or the liquid jet recording head is exchanged are disposed being separated at a prescribed distance.

Accordingly, when the liquid jet recording head is retreated at the initial position, it is not possible to exchange the recording liquid tank cartridge or the liquid jet recording head. However, when a maintenance mode is selected, the liquid jet recording head is conveyed from the initial position to the maintenance region, and thus it becomes possible to exchange the recording liquid tank cartridge or the liquid jet recording head.

As one method of exchanging the recording liquid tank cartridge or the liquid jet recording head, the maintenance region disposed on a top surface of the liquid jet recording head is opened by separating the scanner unit at the upper stage of the apparatus from the liquid jet recording unit at the lower stage of the apparatus. As another method, the maintenance region is opened by opening an access cover disposed on the liquid jet recording unit.

Further, as a method for separating the scanner unit from the liquid jet recording unit, a method by which the scanner unit is opened into a crocodile mouth shape from the front of the apparatus (see, for example, Japanese Laid-Open Patent Publication No. 2004-235831) is known, and a method by which the scanner unit is slidably opened is also known. According to the former method, an amount of extrusion from the apparatus body occurring due to opening of the scanner unit can be set to be small. In addition, the former method has an advantage that the apparatus can be manufactured with a simple configuration and at a low cost. On the other hand, according to the latter method, a portion of the scanner unit is extruded from the apparatus body by a conveyance length required for opening, and accordingly, it is necessary to secure a region equivalent to the amount of extrusion of the scanner unit in setting up the apparatus body. In addition, by the latter method, the configuration becomes complex and the manufacturing cost is high.

The operation for selecting the maintenance mode is also carried out in removing the recording medium jammed in a recording medium conveyance section of the liquid jet recording unit.

However, in the image input/output apparatus of the above type, the depth of the apparatus body is increased because a flat bed type scanner unit is disposed. Besides, as a design factor, an amount of extrusion of the recorded recording medium which is discharged to the front of the apparatus has to be set small. Therefore, a recording position (a scanning position of a carriage which is mounted with a liquid jet recording head) at which the droplet is jetted onto the recording medium is set at the innermost of the apparatus body.

Because of this, when the maintenance mode is selected to exchange the recording liquid tank cartridge or the liquid jet recording head, it is necessary for the operator to enter his/her fingers into the maintenance region which is provided in the innermost portion of the apparatus body. In addition, interior illumination is shielded in the periphery of the maintenance region by the scanner unit at the upper stage of the apparatus. Therefore, it is necessary for the operator to carry out the exchange work of the recording liquid tank cartridge and the like under a hand shadow condition, and accordingly, the exchange work becomes complicated.

SUMMARY OF THE INVENTION

The present invention is directed to an image input/output apparatus in which it is not necessary to carry out an exchange work of a recording liquid tank cartridge and the like under a hand shadow condition and workability of an operator is improved.

In one aspect of the present invention, an image input/output apparatus includes an apparatus body having upper and lower stages and a scanner unit disposed at the upper stage of the apparatus body. The scanner unit includes an original platen, and a light source operable to illuminate the original platen with a luminous flux. The apparatus also includes a recording unit provided at the lower stage of the apparatus body having a maintenance mode, a window provided so as to allow light to pass through between the scanner unit and the recording unit; an exposure controlling unit configured to control the light source to illuminate the original platen in the case of the recording unit being in the maintenance mode; and an irradiation unit configured to irradiate an inside of the recording unit with luminous flux emitted from the light source passing through the window.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

A best mode for carrying out the present invention is as described in the following embodiments.

First Embodiment

Figure 1:
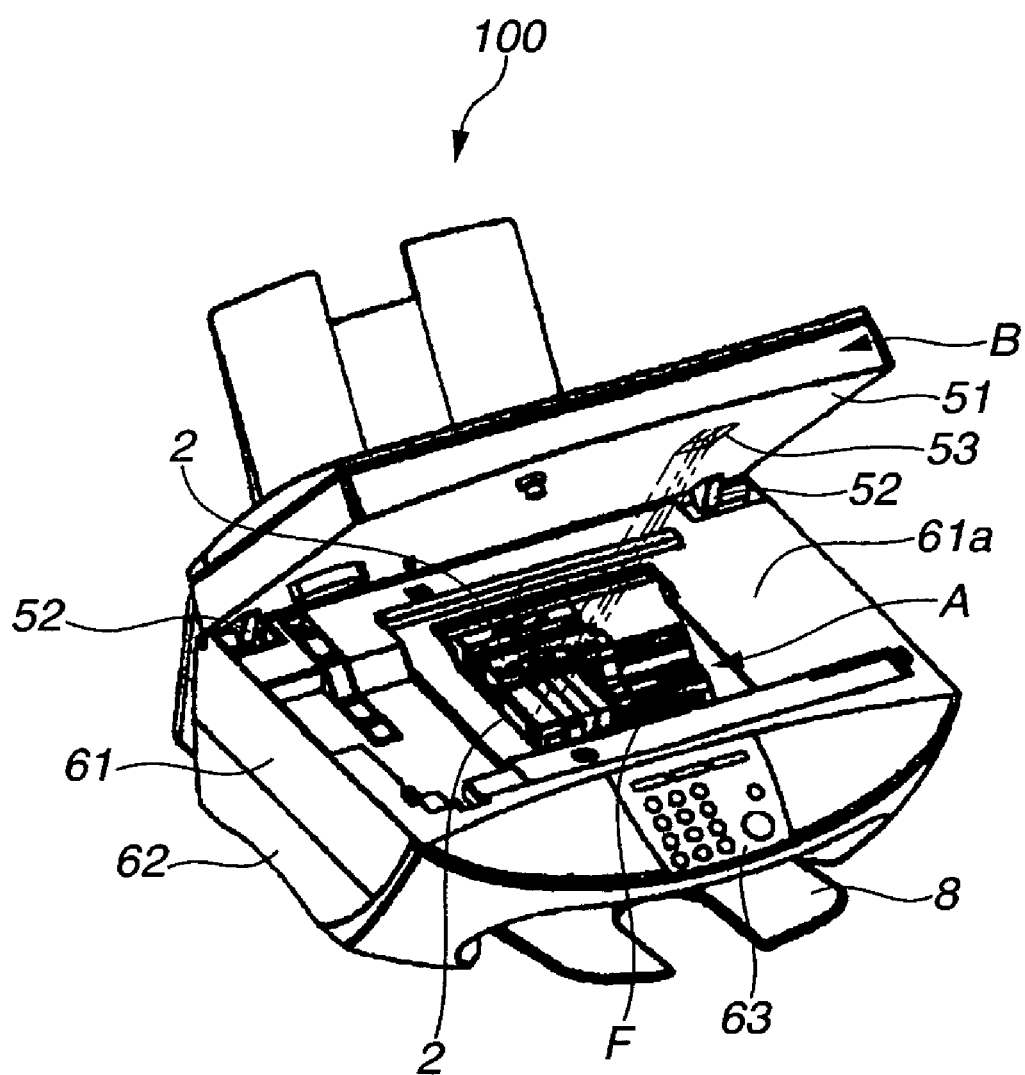
FIG. 1 is an external perspective view showing an image input/output apparatus which is a first embodiment of the present invention.

FIG. 1 is an external perspective view showing an image input/output apparatus 100 according to a first embodiment of the present invention.

Figure 2:
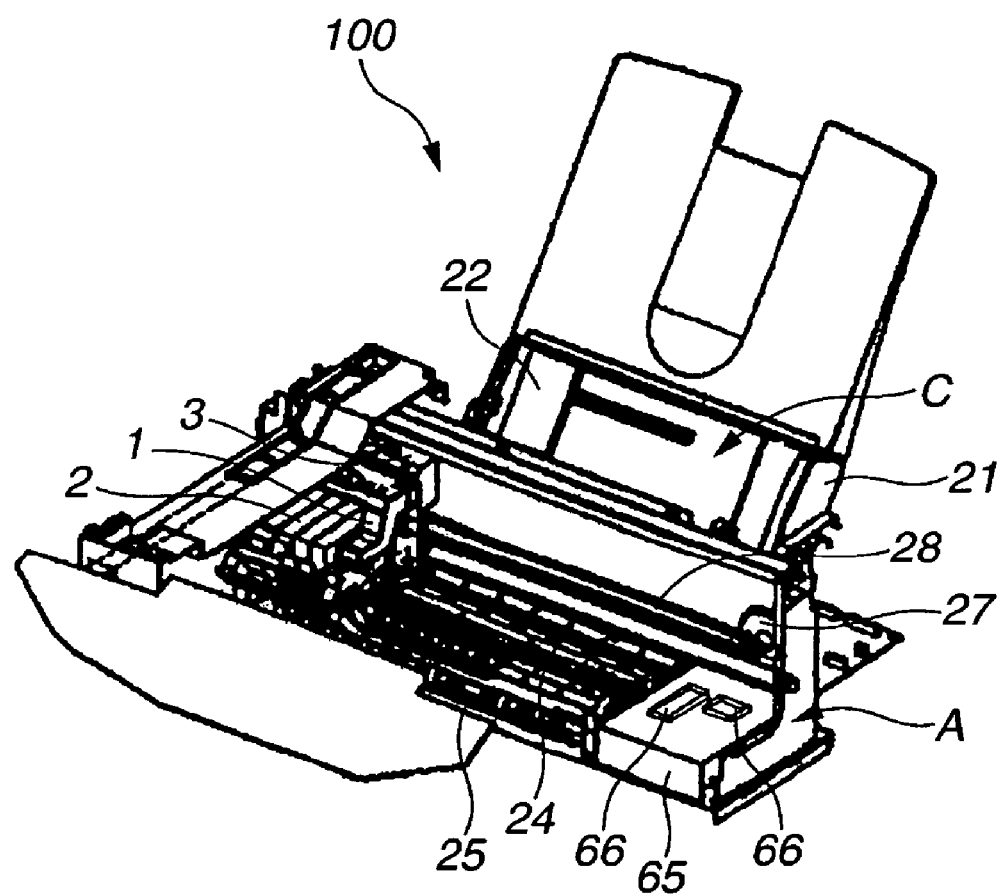
FIG. 2 is a perspective view which shows the image input/output apparatus viewed from a slant front side, with an external cover and an image reading unit omitted.

FIG. 2 is a perspective view which shows the image input/output apparatus 100 viewed from a slant front side, with an external cover and an image reading unit omitted.

Figure 3:
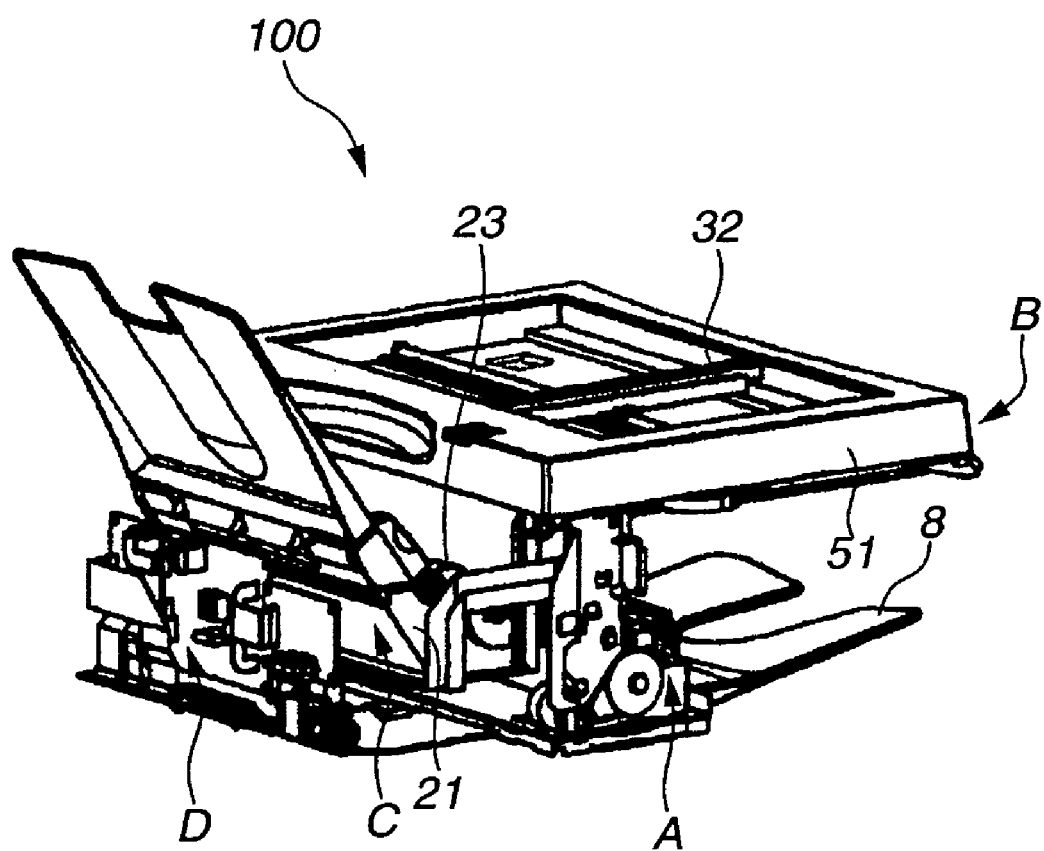
FIG. 3 is a perspective view which shows the image input/output apparatus viewed from a slant back side, with the external cover taken off.

FIG. 3 is a perspective view which shows the image input/output apparatus 100 viewed from a slant back side, with the external cover taken off.

Figure 4:
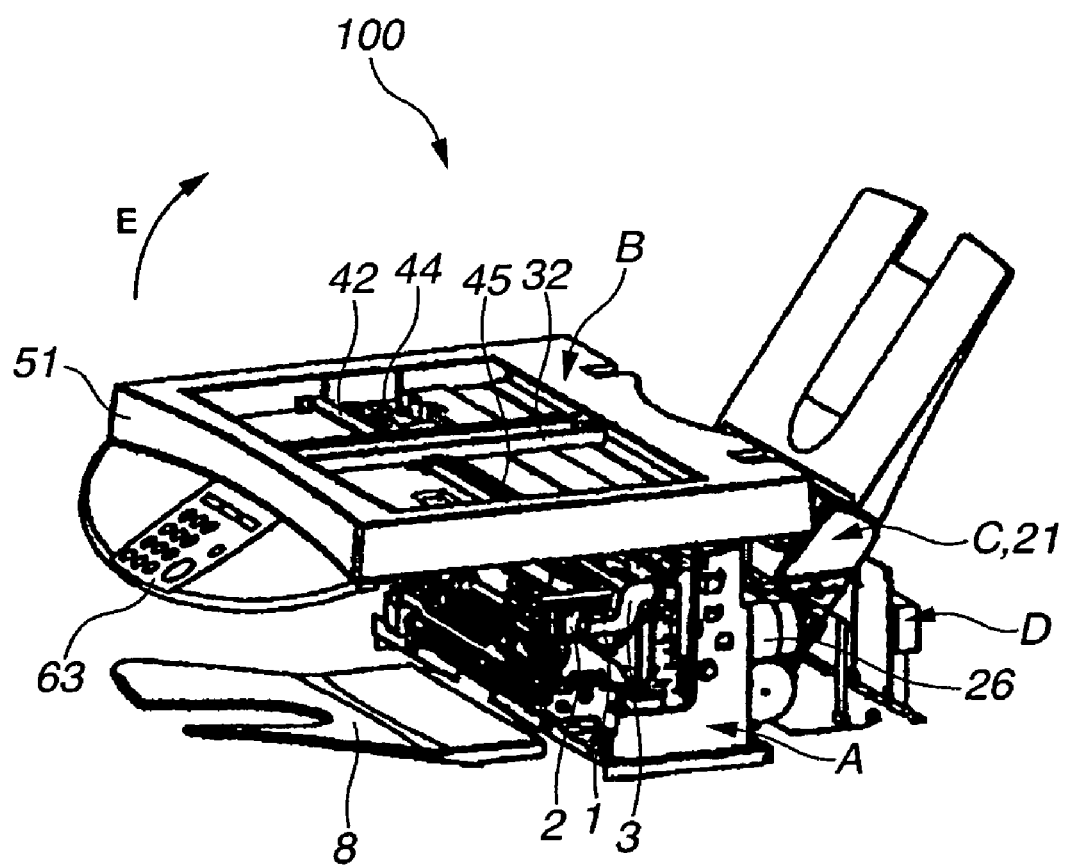
FIG. 4 is a perspective view which shows the image input/output apparatus viewed from a slant front side, with the external cover taken off.

FIG. 4 is a perspective view which shows the image input/output apparatus 100 viewed from a slant front side, with the external cover taken off.

Figure 5:
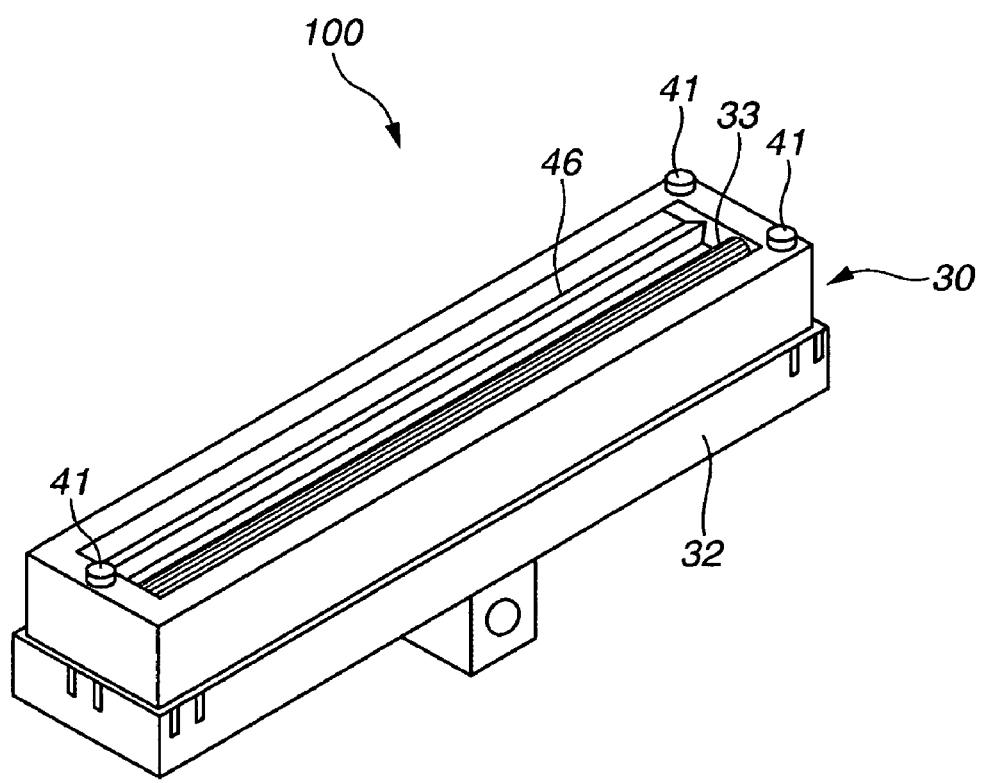
FIG. 5 is a perspective view showing an external appearance of an image reading section installed on a scanner unit of the image input/output apparatus.

FIG. 5 is a perspective view showing an external appearance of an image reading section installed on a scanner unit of the image input/output apparatus 100.

Figure 6:
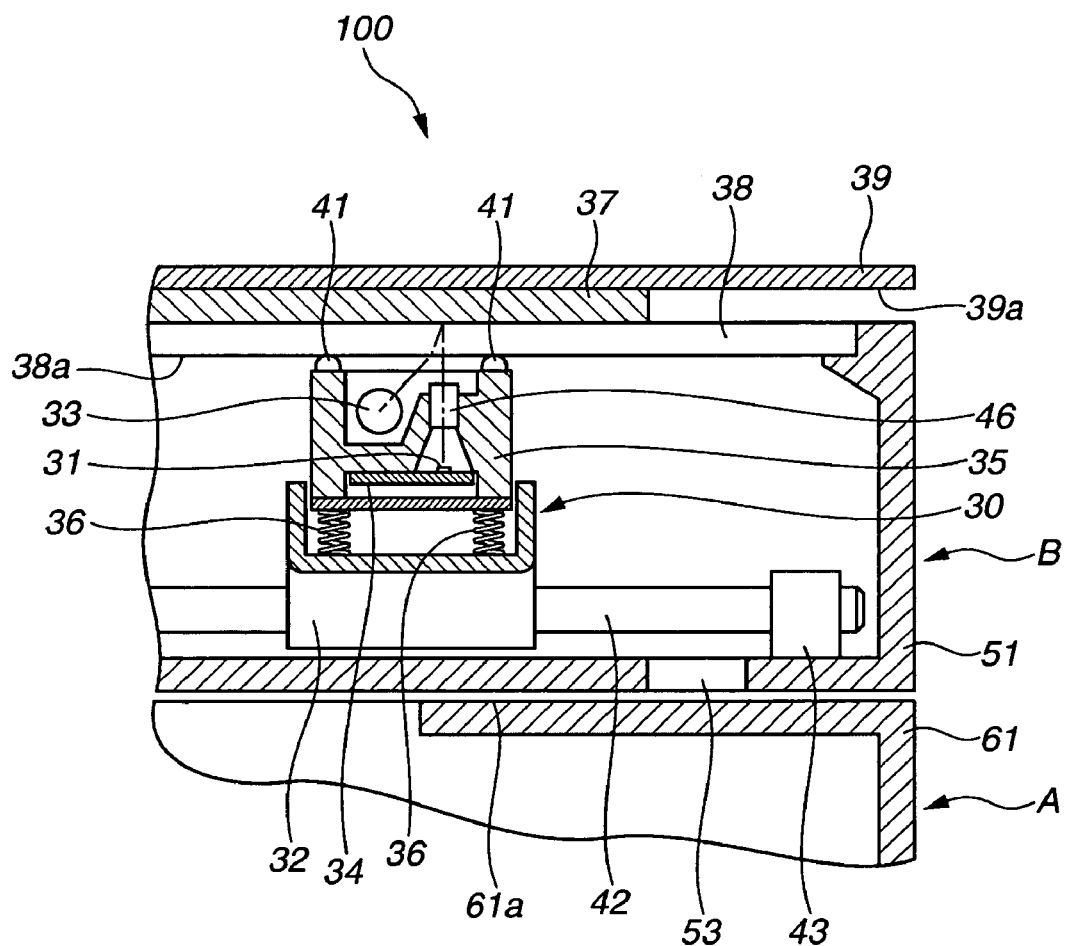
FIG. 6 is a cross sectional side view of a periphery of the image reading section of the scanner unit, showing the image reading section in a state of reading an original.

FIG. 6 is a cross sectional side view of a periphery of the image reading section of the scanner unit, showing the image reading section in a state of reading an original.

Figure 7:
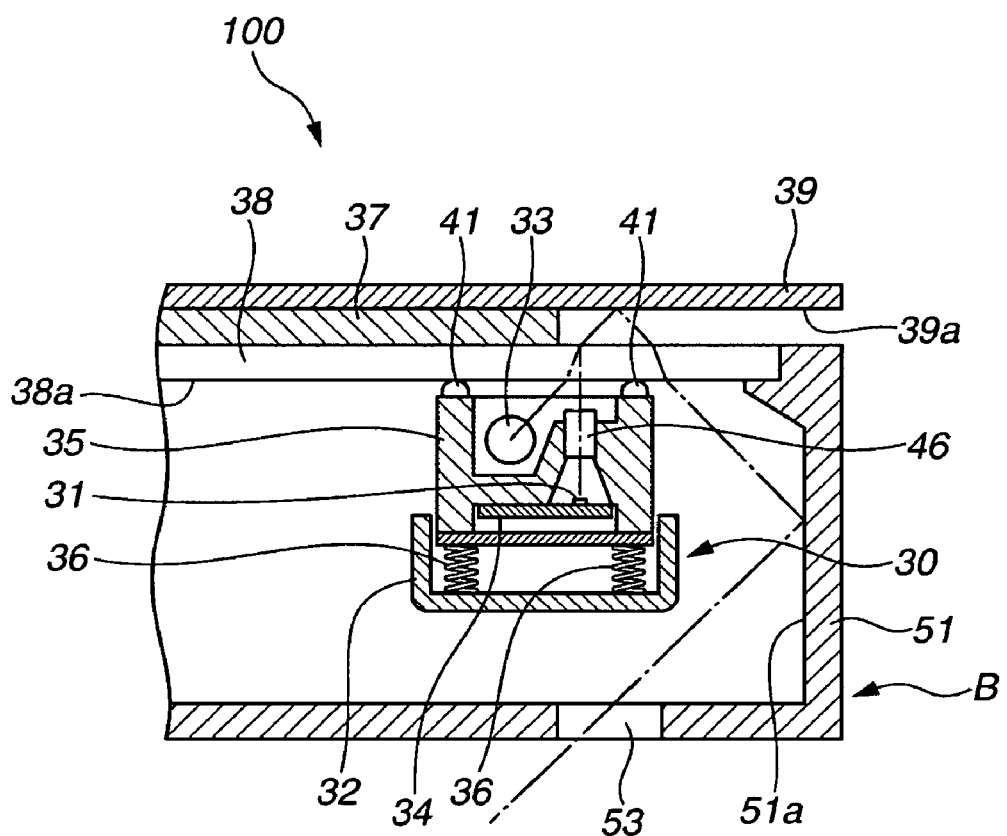
FIG. 7 is a cross sectional side view of the periphery of the image reading section of the scanner unit, showing a state in which the image reading section at a retreating position irradiates an inside of the liquid jet recording unit.

FIG. 7 is a cross sectional side view of the periphery of the image reading section of the scanner unit, showing a state in which the image reading section at a retreating position irradiates an inside of the liquid jet recording unit.

The image input/output apparatus 100 is provided with a liquid jet recording unit A of a liquid jet recording type, a scanner unit B which optically reads the original, a paper sheet feeding unit C which supplies a stacked recording medium to the liquid jet recording unit A by separating the stacked recording medium, and an electric device section D having a power supply section and a control section.

In the image input/output apparatus 100, maintenance work is carried out by opening the scanner unit B into a crocodile mouth shape from the front of the image input/output apparatus and by exposing a maintenance region F, in an exchange mode in which a recording liquid tank cartridge 2 or a liquid jet recording head 1 is exchanged, or in a jamming handling mode for removing the recording medium jammed in a conveyance section.

As shown in FIG. 1, the image input/output apparatus 100 is covered with an upper cover 61 and a lower cover 62, and the scanner unit B is disposed at an upper stage of the upper cover 61. The maintenance region F is formed so as to be opened in a center portion of a top surface of the upper cover 61. It is possible to look into an inside of the liquid jet recording unit A from the maintenance region F.

First, a configuration of the liquid jet recording unit A is explained.

The liquid jet recording head 1 carries out an image recording by jetting a droplet onto the recording medium. According to the first embodiment, in the liquid jet recording head 1, the recording liquid tank cartridge 2 is separately configured. When the recording liquid within the recording liquid tank cartridge is depleted, only the desired recording liquid tank cartridge can be replaced with a new recording liquid tank cartridge.

The liquid jet recording head 1 is installed on a carriage 3 which reciprocates in a direction (a main scanning direction) orthogonal to a direction of conveyance of the recording medium. The main scanning, performed by a reciprocating movement of the carriage 3, is carried out by a pulley 27 and a timing belt 28 that is driven by a motor 26. At the time of the main scanning by the carriage 3, a print signal and power applied to the liquid jet recording head 1 are supplied by an electric circuit of the electric device section D via a flexible cable (not shown). In addition, the liquid jet recording head 1 and the flexible cable are mutually connected by pressure welding of contacts between the liquid jet recording head 1 and the flexible cable.

A discharge recovery unit 65 carries out a process for refreshing (discharge recovery process) the recording liquid in an inner portion of a discharge port of the liquid jet recording head 1 so that poor discharge due to air bubbles and dust remaining in an inner portion of a discharge port, thickening due to evaporation of the recording liquid solvent, and the like are prevented. The discharge recovery unit 65 is configured of a cap 66 capable of covering the periphery of the discharge port of the liquid jet recording head 1 in close contact therewith, a pump (not shown) which communicates with the cap 66 and generates a suction force, a flexible material for wiping the recording liquid remaining in the periphery of the discharge port of the liquid jet recording head 1, a blade (not shown), and the like.

When a print waiting mode is selected or a power switch of the apparatus body is switched off, the liquid jet recording head 1 is conveyed above the discharge recovery unit 65 by the carriage 3, and the cap 66 of the discharge recovery unit 65 comes in pressure contact with a discharge port forming surface of the liquid jet recording head 1 and comes into a capping state where the discharge port forming surface is sealed off.

When an exchange mode in which the liquid jet recording head 1 or the recording liquid tank cartridge 2 is exchanged, the cap 66 of the discharge recovery unit 65 is separated from the liquid jet recording head 1 and the liquid jet recording head 1 is conveyed to the maintenance region F by the carriage 3. On the other hand, when the jamming handling mode to remove the recording medium jammed at the conveyance section is selected, the liquid jet recording head 1 stops at a print suspension position or is conveyed above the discharge recovery unit and comes into a capping state.

Next, a discharge principle of the liquid jet recording head 1 is explained.

The liquid jet recording head 1, in general, is provided with a minute discharge port, a nozzle, an energy acting section provided to one part of the nozzle, and an energy generation section for generating droplet forming energy for acting on the recording liquid existing in the energy acting section. The liquid jet recording head 1 can be exchanged by attaching and detaching to and from the carriage 3.

For the energy generation section which generates the energy, one type uses an electromechanical conversion member such as a piezo element. In another type, the recording liquid is heated by an electrothermal transducer, and the recording liquid is discharged. Among these, the liquid jet recording head 1 used in the ink jet recording system in which the recording liquid is discharged by thermal energy is capable of arranging the discharge ports of high density. Such ports discharge the droplet for recording and form the liquid droplets flying at a high density, accordingly it is possible to process the recording of a high resolution at a high speed.

Besides, with regard to the liquid jet recording head 1 using the electrothermal transducer as a energy generating unit, it is possible to easily obtain the liquid jet recording head which is downsized or made longer as a whole. It is easy to employ multinozzles and mount the head in a higher density. Also, the liquid jet recording head 1 is suitable for mass production, therefore, a manufacturing cost thereof is low.

The liquid jet recording head 1 including the electrothermal transducer, in general, is provided with the discharge port and a nozzle corresponding to various kinds of recording liquid. The recording liquid is supplied from a common liquid chamber communicating with each nozzle. Film boiling occurs in the recording liquid due to heating of the electrothermal transducer, and the recording liquid is discharged from the discharge port at a tip of the nozzle by a pressure of the film boiling.

Next, a configuration of the scanner unit B is explained.

The scanner unit B is disposed at the upper stage of the liquid jet recording unit A.

A scanner housing 51 is a housing of the scanner unit B. The scanner housing 51 is provided at a back portion of the apparatus and is pivotably supported by a hinge 52 connecting the liquid jet recording unit A and the scanner unit B. The scanner housing 51 can be opened and closed in a swinging way in a crocodile mouth shape from the front of the image input/output apparatus 100.

When the scanner unit B is rotated in a direction of an arrow E as shown in FIG. 4, a space necessary for exchanging the liquid jet recording head 1 and exchanging the recording liquid tank cartridge 2 (the maintenance region F) is opened (see FIG. 1). In addition, a window 53, which is formed as an opening, is provided on a base surface of the scanner housing 51.

Figure 8:
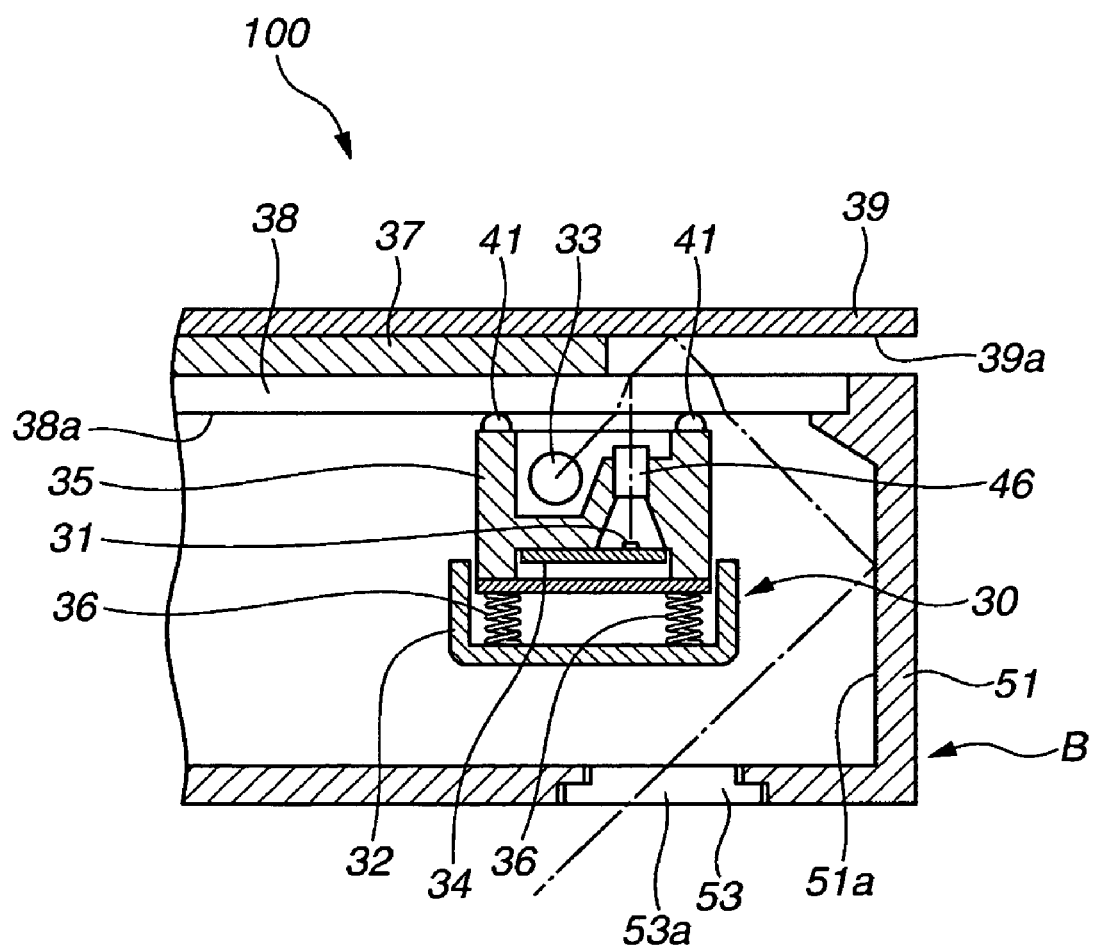
FIG. 8 is a view showing an example in which a transparent member is fixed in the window according to the first embodiment.

FIG. 8 is a view showing an example in which a transparent member 53a is fixed in the window 53 according to the first embodiment.

The window 53 is formed as an opening. However, other configurations may be employed in which the transparent member 53a is fixed in the window 53 as shown in FIG. 8.

A reading section 30 is configured of a contact type image sensor 31, a sensor carriage 32, a linear light source 33, an A/D converter 34, an image sensor body 35, a condensing lens 46, a coil spring 36, and the like. The contact type image sensor 31 is mounted on the A/D converter 34, which is held by the image sensor body 35.

An original platen (light transmissible plate) 38 is configured of a transparent glass plate mounted on an upper portion of the scanner housing 51, on which an original is placed. An original platen cover 39 is swingably held by the scanner housing 51 and is capable of covering the original stand 38. An original pressure plate 37 is fixed on a lower surface of the original platen cover 39 and covers only an effective image reading region of the original stand 38.

The coil spring 36 serves as a pressing unit for pressing the image sensor body 35 against a back surface 38a of the original platen 38. The coil spring 36 resiliently holds the image sensor body 35, enabling up-and-down movement in relation to the sensor carriage 32. Three abutting members 41 are spacers of the contact type image sensor 31 and receive a repulsive force of the coil spring 36. A desired relative distance between the reading section 30 and the original platen 38 is secured by the three abutting members 41 being abutted on the back surface 38a of the original platen 38 (in other words, a surface opposite to the surface on which the original is placed).

The sensor carriage 32 is provided with a pair of guide bearings 43 for supporting a guide shaft 42. The sensor carriage 32 can freely reciprocate along the guide shaft 42 disposed in a direction orthogonal to the direction of conveyance of the recording medium (the direction of main scanning of the recording liquid tank cartridge 2 of the liquid jet recording unit A). The sensor carriage 32 is driven by a drive system configured of a scanner motor 44, a timing belt 45, and a pulley (not shown), and is reciprocatingly conveyed.

With the above configuration, the luminous flux emitted by the linear light source 33 is reflected on a surface of the original placed on the original platen 38 and is condensed to the contact type image sensor 31 by the condensing lens 46, and then image information of the original is read. That is, the whole region of effective image information of the original placed on the original platen 38 is sequentially read by the contact type image sensor 31 conveying the reading section 30. The image information read by the contact type image sensor 31 is transmitted to the electric device section D by a flexible cable (not shown) and the like.

FIG. 6 is a view showing a state in which the reading section 30 carries out exposure scanning and the image information of the original placed on the original platen is being read according to the first embodiment.

In this state, the luminous flux emitted by the linear light source 33 is reflected off the original and is converged on the condensing lens 46. At the time of image reading when the reading section 30 carries out the exposure scanning, the scanner unit B is closed. Because the window 53 is covered with a ceiling surface 61a of the upper cover 61 at this time, the passage or transmission of the luminous flux is shielded. In this way, in the state where the maintenance mode is not selected, the window 53 is not covered. When image recording is carried out, the droplet mist splashed from the surface of the recording liquid is not stirred up. Therefore, the splashed droplet does not adhere to the window 53, and the transparency of the window 53 is not impaired.

FIG. 7 is a cross sectional view showing a state where the reading section 30 is stopping at the retreating position according to the first embodiment.

In the state as shown in FIG. 7, when the linear light source 33 irradiates, the luminous flux emitted from the linear light source 33 passes a region away from the effective image reading region, is reflected on a lower surface 39a of the original platen cover 39, passes again the original platen 38, is reflected on a side surface 51a of the scanner housing 51, passes the window 53 of the base surface of the scanner housing (the window 53 opens the base surface of the scanner housing) or passes through the window 53 of the base surface of the scanner housing (the transparent member 53a is fixed in the window 53), and illuminates the inside of the liquid jet recording unit A.

That is, when the linear light source 33 irradiates in the state where the scanner unit B is opened into a crocodile mouth shape from the front of the apparatus (the state where the maintenance mode is selected), a reflection position of the luminous flux and the arrangement of the window are set so that a desired area of the maintenance region F is sufficiently illuminated. Thus, a traveling direction of the luminous flux is guided.

Therefore, by improving a reflection ratio of a luminous flux reflection section in the scanner unit B and a transmittance of the window 53, deterioration of illuminance in the periphery of the maintenance region F is alleviated.

Figure 9:
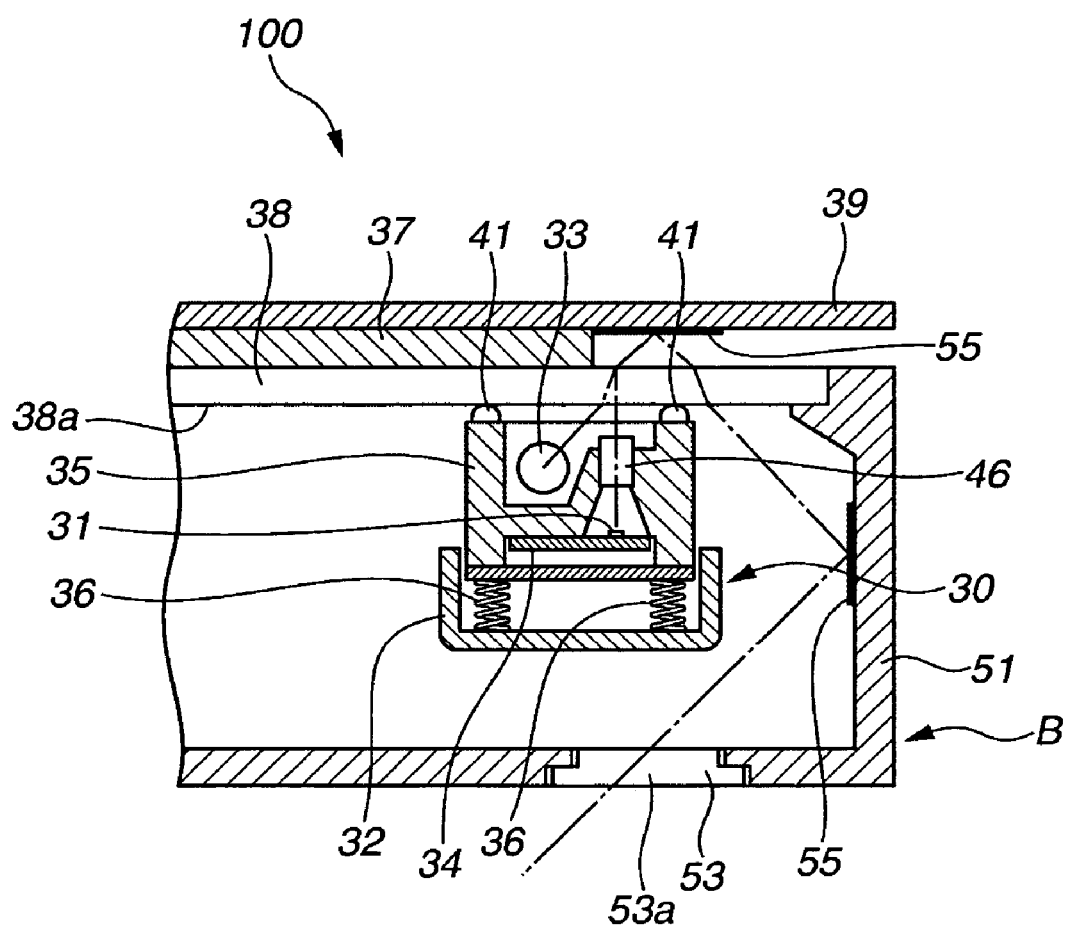
FIG. 9 is a view showing an example in which the deterioration of the illuminance is reduced by attaching a reflection member onto a luminous flux reflection surface according to the first embodiment.

FIG. 9 is a view showing an example in which the deterioration of the illuminance is controlled by attaching a reflection member 55 onto a luminous flux reflection surface according to the first embodiment.

More specifically, effective methods for reducing the deterioration of the luminance are to improve the plane accuracy of the luminous flux reflection surface (a reflection section of the lower surface 39a of the original platen cover 39, and a reflection section of the side surface 51a of the scanner housing 51) in the scanner unit B, and to effect gloss finish, and to paste the reflection member 55 having the reflection ratio of 80% or more such as the transparent glass plate, an aluminum plate, a copper plate, and the like as shown in FIG. 9.

On the other hand, in fixing the transparent member 53a on the window 53, it is effective to employ a material having a light transmission ratio of 80% or more such as a glass plate, an acrylic plate, a vinyl chloride plate, or a polycarbonate plate.

Next, a configuration of the paper sheet feeding unit C is explained.

An automatic sheet feeder (ASF) 21 accumulates and carries a plurality of sheets of the recording medium. A slider 22 guides a side surface position of the recording medium mounted on the ASF 21. A sheet feed roller 23 feeds the recording medium stored and loaded on the ASF 21 toward the image recording unit A.

Next, an outline of a flow of the recording medium in the image input/output apparatus 100 is explained.

The recording medium which is stored and loaded on the ASF 21 and whose side face is guided by the slider 22 is fed by the sheet feed roller 23 and is sandwiched and conveyed by a pair of conveyance rollers 24 and a wheel (not shown). Then, when the recording medium enters the inside of the liquid jet recording unit A, the droplet is jetted from the liquid jet recording head 1 and the image is formed on the recording medium. A pair of sheet discharge rollers 25 and a spur (not shown) are provided on a downstream side of the liquid jet recording head 1. The recording medium is sandwiched and conveyed by the sheet discharge rollers 25 and the spur, and discharged on a sheet discharge tray 8 provided in a front portion of the apparatus body.

The electric device section D is provided with a control board of the liquid jet recording unit A, a control board of the scanner unit B, a system control board for controlling the whole image input/output apparatus 100, an operation control board, a power supply board, and the like.

In addition, the upper cover 61 is provided with an operation panel 63. The operation panel 63 is electrically connected with the operation control board (not shown) which is disposed on a backside thereof.

Next, an operation of the maintenance mode is explained.

First, an operation of the exchange mode such as the exchange of the recording liquid tank cartridge 2, and exchange of the liquid jet recording head 1 is explained.

When the liquid jet recording head 1 is in the capping state and when an operator opens the scanner unit B into a crocodile mouth shape from the front of the apparatus, the image input/output apparatus 100 recognizes that the exchange mode is selected, and the cap 66 of the discharge recovery unit 65 is separated from the liquid jet recording head 1, and the liquid jet recording head 1 is conveyed by the carriage 3 to the maintenance region F (the opening portion of the top surface of the upper cover 61) and stopped there. Further, in the scanner unit B, the linear light source 33 of the reading section 30 irradiates in the retreat state, and the luminous flux emitted from the linear light source 33 passes or passes through the window 53 provided on the base surface of the scanner housing 51 and illuminates the periphery of the maintenance region F of the liquid jet recording unit A.

Therefore, the operator can insert his/her hand into the maintenance region F which has been lightened by the illumination and carry out an exchange work of the liquid jet recording head 1 and the recording liquid tank cartridge 2. Thus, the exchange work is remarkably improved.

Next, an operation of the jamming handling mode for removing the recording medium jammed at the conveyance section is explained.

In a state where a recording sheet is jammed at the conveyance section during a print operation of the liquid jet recording unit A and the conveyance of the recording medium is suspended, when the operator opens the scanner unit B into the crocodile mouth shape from the front of the apparatus, the image input/output apparatus 100 recognizes that the jamming handling mode is selected, and the linear light source 33 of the reading section 30 of the scanner unit B irradiates in the retreat state and the luminous flux emitted from the linear light source 33 passes or passes through the window 53 provided on the base surface of the scanner housing 51 and illuminates the periphery of the maintenance region F of the liquid jet recording unit A.

Therefore, the operator can insert his/her hand into the maintenance region F which has been lightened by the illumination and carry out removing the recording medium jammed in the midway of a sheet conveyance path. Thus, the jamming handling work is remarkably improved.

When the processing of the maintenance mode (the exchange mode and the jamming handling mode) is ended and the crocodile mouth-shaped opening of the scanner unit B is closed, the linear light source 33 of the reading section is immediately shut off. In addition, when a prescribed period of time has passed after the maintenance mode is selected and the irradiation by the linear light source is started, the linear light source 33 is automatically shut off. Accordingly, continuous irradiation time of the linear light source 33 is restricted, waste of power consumption of the whole apparatus body can be prevented, and the life of the light source can be extended.

The configuration of the image input/output apparatus 100 according to the first embodiment is as described above. However, with respect to the configuration, the luminous flux emitted by the linear light source 33 only has to be guided to the liquid jet recording unit A. Accordingly, another configuration may be such that no reflection surface is provided at a prescribed position as in the first embodiment and an unspecified luminous flux which has been irregularly reflected in the scanner unit B passes or passes through the window 53 so as to be utilized for illuminating the maintenance region F.

Besides, the luminous flux emitted by the same linear light source 33 may be separated to two optical paths, and one luminous flux is set to the optical path for reading the original and the other luminous flux is set to the optical path for illuminating the maintenance region F. In the configuration of two optical paths like this, the two optical paths are not used at the same time, therefore the optical path which is not used with a shutter member and the like is shielded.

Further, in the first embodiment, the liquid jet recording head 1 and the recording liquid tank cartridge 2 are separately provided, however, the liquid jet recording head may have the liquid jet recording head 1 and recording liquid tank which are integrated with each other. In the head like this, if the recording liquid is depleted, the maintenance region F has to be opened to exchange the liquid jet recording head 1 with a new head.

Further, the first embodiment can be applied to a reversed scanner unit in which the original is placed between the liquid jet recording unit A and the scanner unit B (a configuration in which a platen is provided on the base of the scanner unit and the image reading section is provided above the scanner unit).

Second Embodiment

Figure 10:
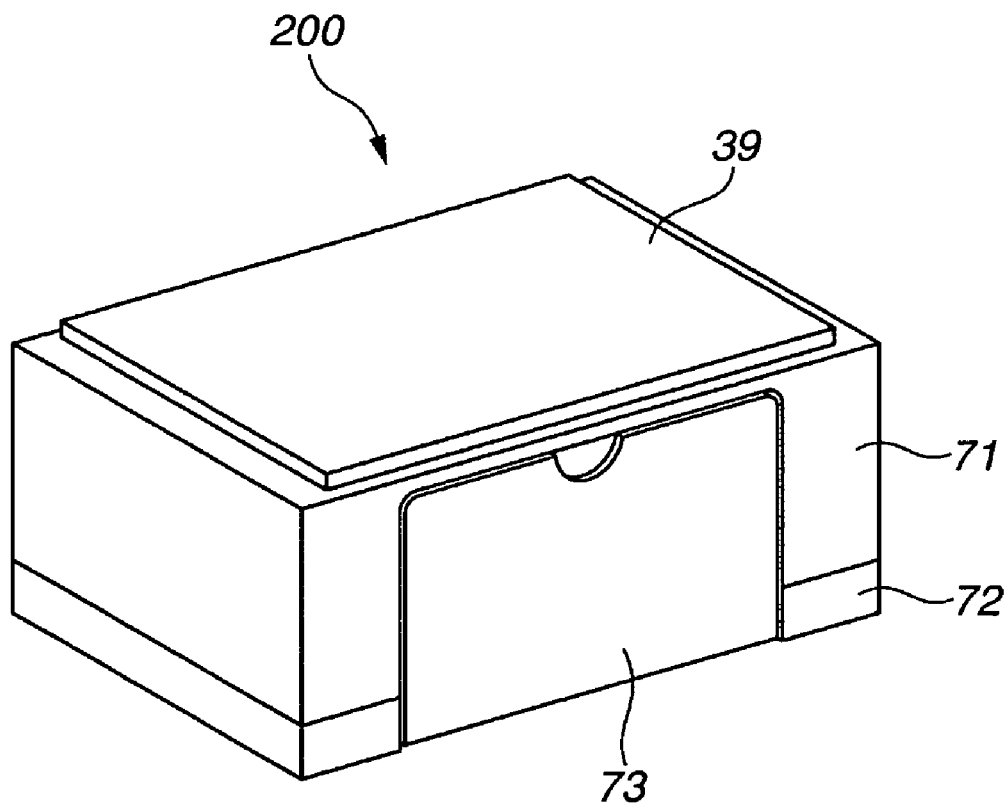
FIG. 10 is an external perspective view of an image input/output apparatus which is a second embodiment of the present invention, and is a state diagram showing a state in which a paper discharge section cover of the image input/output apparatus is closed.

FIG. 10 is an external perspective view of an image input/output apparatus 200 according to a second embodiment of the present invention, and is a state diagram showing a state in which a paper discharge section cover of the image input/output apparatus 200 is closed.

Figure 11:
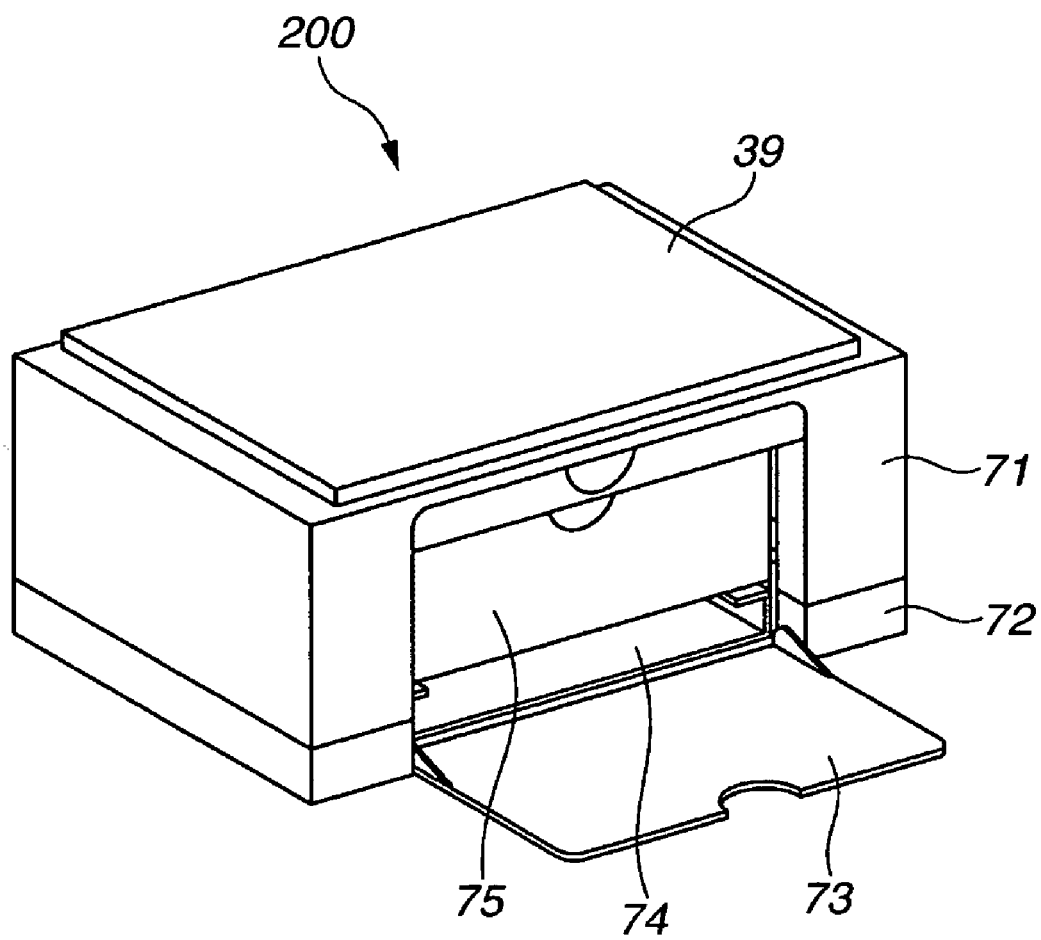
FIG. 11 is a perspective view showing a state in which the paper discharge section cover is closed according to the second embodiment.

FIG. 11 is a perspective view showing a state in which the paper discharge section cover is closed according to the second embodiment.

Figure 12:
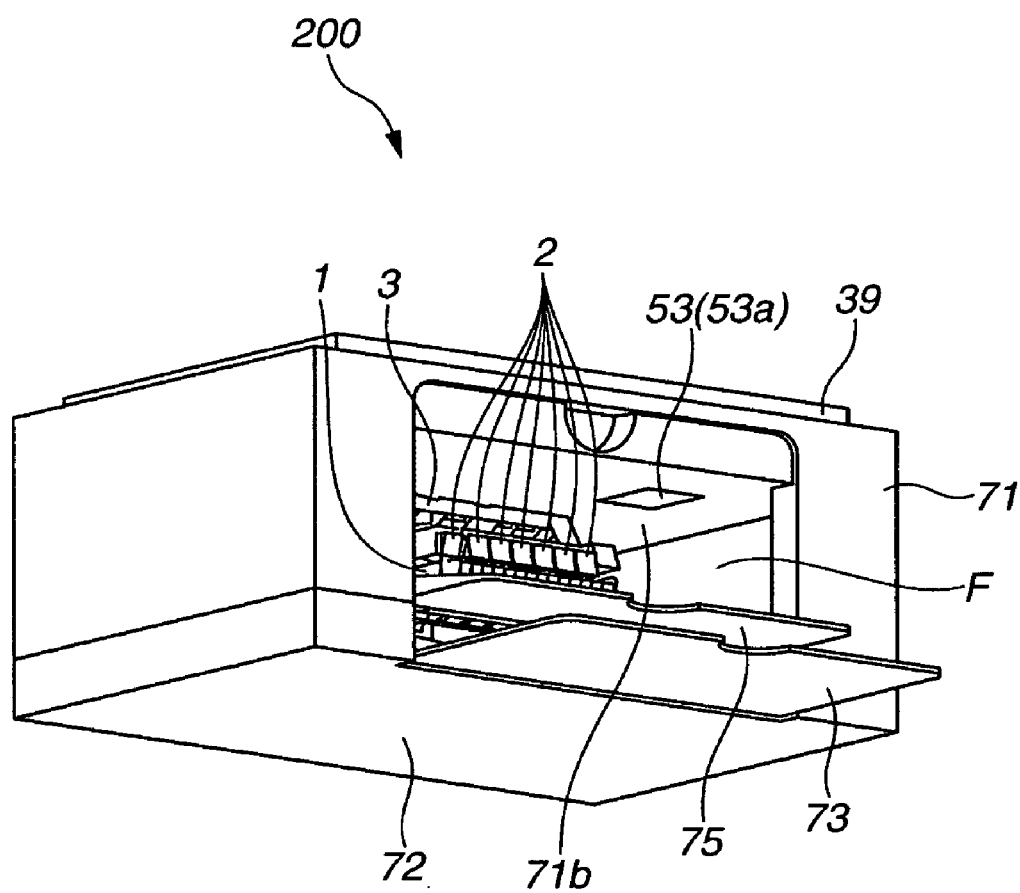
FIG. 12 is a perspective view showing a state in which an access cover for selecting the maintenance mode is opened according to the second embodiment.

FIG. 12 is a perspective view showing a state in which an access cover for selecting the maintenance mode is opened according to the second embodiment.

Figure 13:
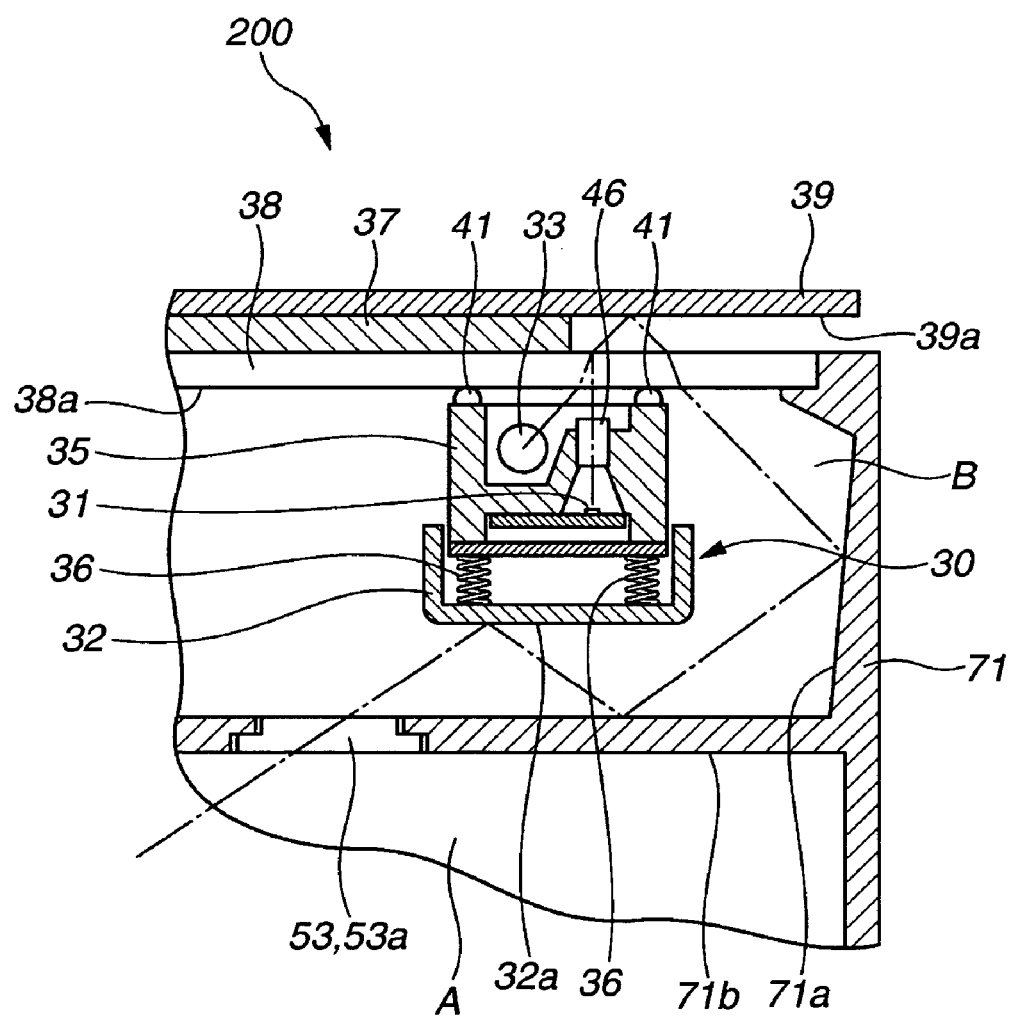
FIG. 13 is a cross sectional side view showing a state in which the reading section of the scanner unit at the retreating position irradiates the inside of the liquid jet recording unit.

FIG. 13 is a cross sectional side view showing a state in which the reading section of the scanner unit at the retreating position irradiates the inside of the liquid jet recording unit.

In the drawings showing the second embodiment, the same portion as those in the first embodiment is represented by the same numerals and symbols.

The second embodiment is applied to the image input/output apparatus in which the maintenance mode is selected by tilting the access cover in the liquid jet recording unit A to the front of the apparatus.

In the conventional image input/output apparatus, the maintenance region F is opened only in the front of the apparatus, therefore interior illumination which can be brought in the maintenance region F is considerably restricted. In addition, because the interior illumination is further shielded by the insertion of the hand, the operator is required to carry out the maintenance work under a hand shadow condition.

The image input/output apparatus 200 is provided with a main cover 71, a base cover 72 which covers the base surface of the apparatus body, an openable and closable paper discharge section cover 73, a paper discharge guide 74 for discharging the recorded recording medium to a prescribed position, and an openable and closable access cover 75 which is provided in the innermost portion of the paper discharge cover. The liquid jet recording unit A is provided in a lower portion of the main cover 71, and the scanner unit B is mounted in an upper portion of the main cover 71.

In order to select the maintenance mode (the exchange mode or the jamming handling mode), the access cover 75 is tilted forward and the maintenance region F is opened, as shown in FIG. 12.

As shown in FIG. 13, in the state in which the reading section 30 is stopping at the retreating position, when the maintenance mode is selected by tilting forward the access cover 75, the linear light source 33 irradiates, and the luminous flux emitted from the linear light source 33 passes through a region away from the effective image reading region of the back surface 38a of the original platen, is reflected on the lower surface 39a of the original platen cover 39, passes through again the original platen 38, is reflected on a side surface 71a of the main cover 71, is reflected on a base surface 32a of the sensor carriage 32, passes through the transparent member 53a fixed in the window 53 which is provided on a partitioning surface 71b of the main cover 71, and illuminates the maintenance region F in the liquid jet recording unit A. The window 53 may be of a type in which the partitioning surface 71b of the main cover 71 is opened.

As is explained above, in the second embodiment, when the maintenance mode is selected, the linear light source 33 of the reading section 30 stopping at the retreating position irradiates, and the luminous flux emitted from the linear light source 33 passes through the window 53 and illuminates the maintenance region F in the liquid jet recording unit A.

Accordingly, the operator can insert his/her hand into the illuminated maintenance region F, and carry out the exchange work of the liquid jet recording head 1 or the recording liquid tank cartridge 2 and a removal work of the recording medium jammed in the midway of the conveyance path. Thereby, the workability is remarkably improved.

Third Embodiment

Figure 14:
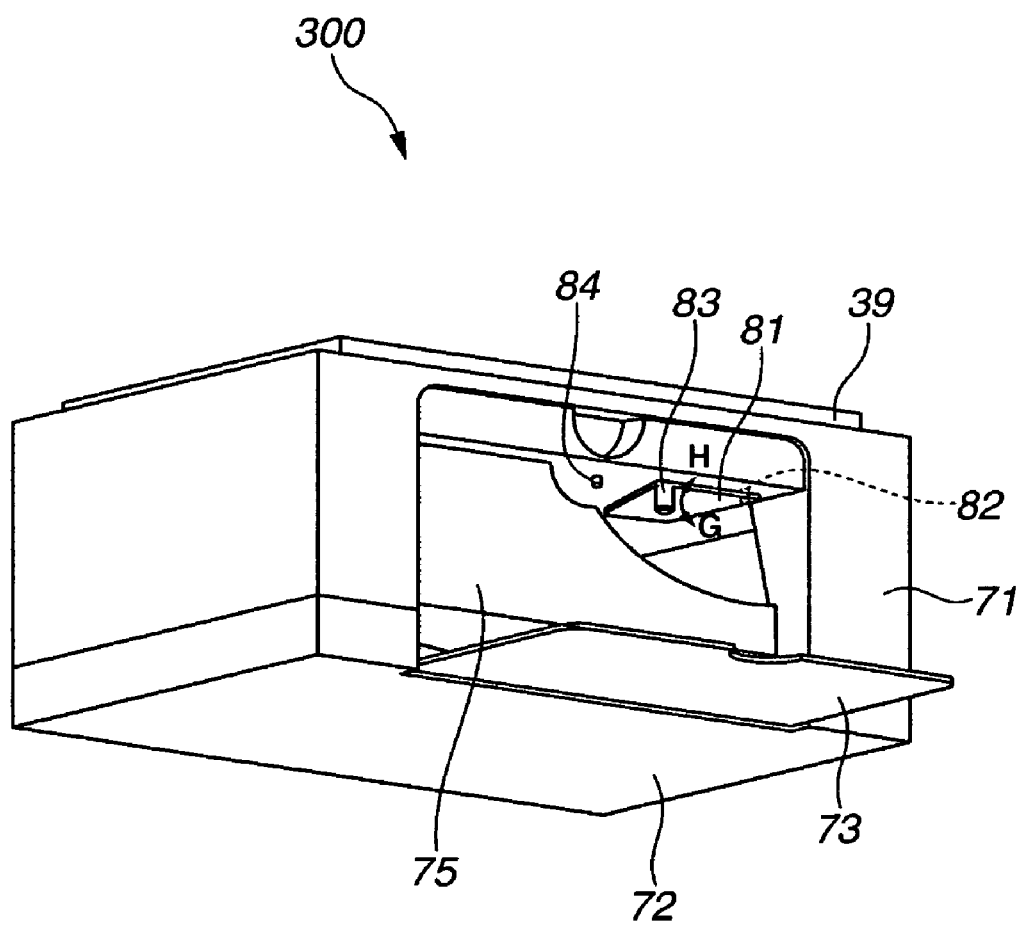
FIG. 14 is an external perspective view showing an image input/output apparatus which is a third embodiment of the present invention, and a view showing a state in which the access cover whose one part is cut out is closed.

FIG. 14 is an external perspective view showing an image input/output apparatus 300 according to a third embodiment of the present invention, and showing a state in which the access cover whose one part is cut out is closed.

Figure 15:
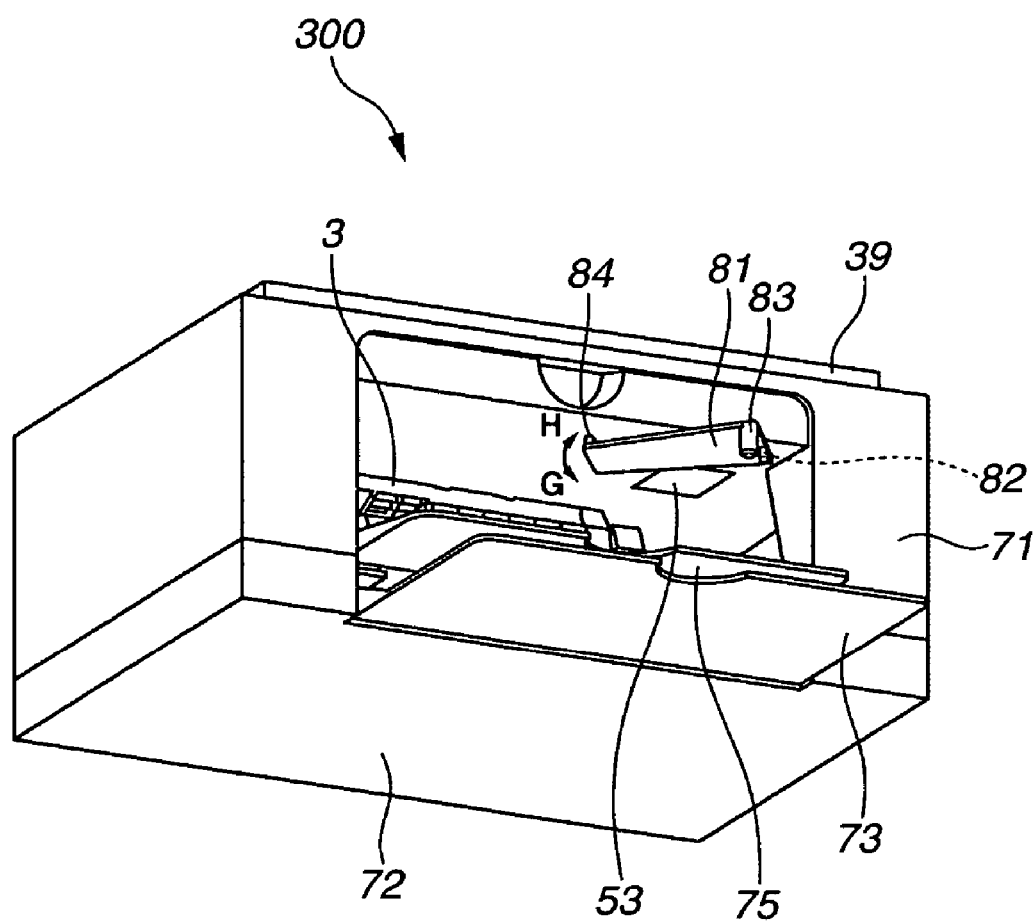
FIG. 15 is an external perspective view showing a state in which the access cover is opened according to the third embodiment.

FIG. 15 is an external perspective view showing a state in which the access cover is opened according to the third embodiment.

The third embodiment is applied to the image input/output apparatus, in which the maintenance mode is selected by tilting forward the access cover 75 in the liquid jet recording unit A to open the access cover 75. A light shielding member which advances or retracts into or from the window 53 in interlock with an opening and closing of the access cover 75 is disposed within the liquid jet recording unit A.

In the drawings showing the third embodiment, the same portion as those in the first embodiment and the second embodiment is represented by the same numerals and symbols.

A light shielding member 81 advances or retracts into or from the window 53 by rotation. The image input/output apparatus 300 is provided with a fulcrum 82 of the light shielding member 81, a projection 83 of the light shielding member, and a stopper 84. The light shielding member 81 is rotatable around the fulcrum 82. A load is constantly applied to the light shield member 81 by an elastic member such as a torsion bar (not shown) so that the light shielding member 81 is rotated in a direction of an arrow H, and stops being abutted onto the stopper 84. In this state, the light shielding member 81 opens the window 53.

On the other hand, when the access cover 75 is closed, the projection 83 is pushed into the innermost portion of the apparatus by the access cover 75, and accordingly, the light shielding member 81 rotates in a direction of an arrow G around 82. By the rotation of the light shielding member 81, the window 53 is completely covered. Thereby, it is possible to protect the window 53 from the mist generated in the liquid jet recording unit A and to maintain the transparency of the window 53.

With the above configuration, when the maintenance mode is selected by tilting the access cover 75, the light shielding member 81 retreats from the window 53 and the window 53 is opened. On the other hand, the linear light source 33 irradiates, and the luminous flux emitted from the linear light source 33 passes through the transparent member 53a fixed in the window 53 and illuminates the maintenance region F of the liquid jet recording unit A.

Fourth Embodiment

Figure 16:
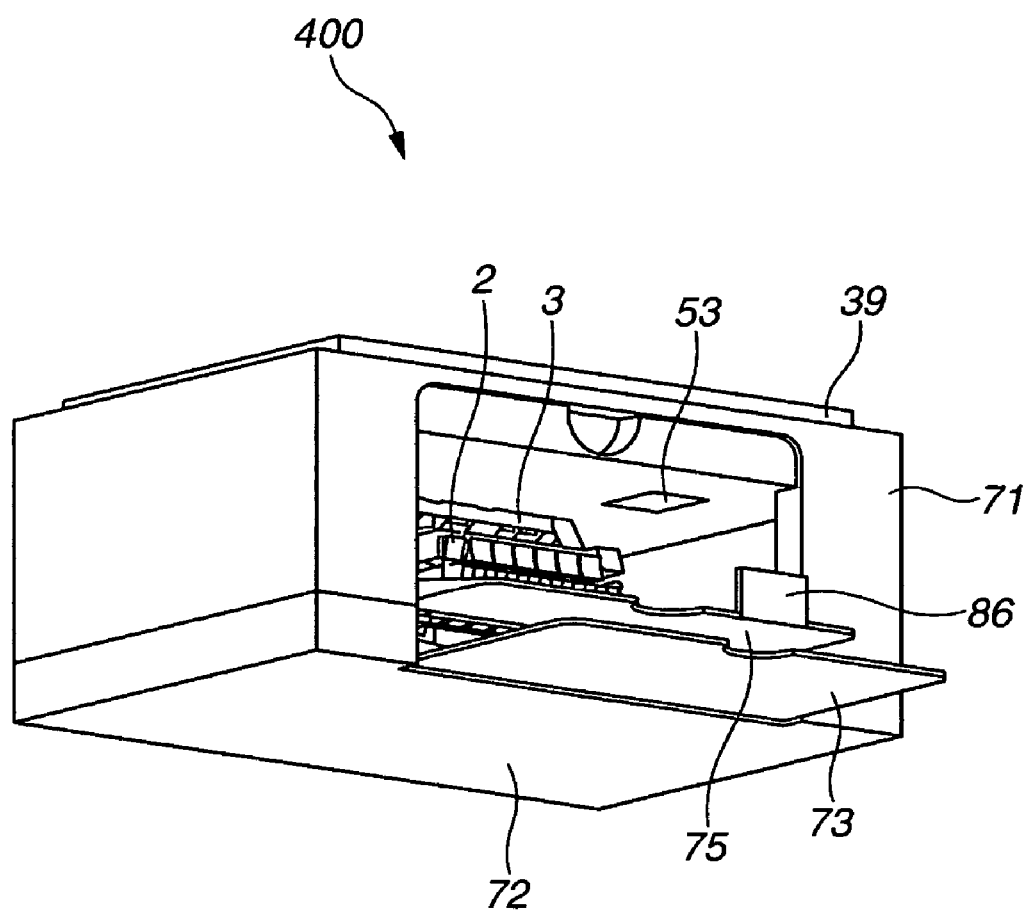
FIG. 16 is an external perspective view showing a state in which the access cover of the image input/output apparatus according to a fourth embodiment of the present invention is opened.

FIG. 16 is an external perspective view showing a state in which the access cover of the image input/output apparatus 400 according to a fourth embodiment of the present invention is opened.

The fourth embodiment is another form of a unit for covering the window 53 in interlock with the operation for closing the access cover 75.

In the drawings showing the fourth embodiment, the same portion as those in the first embodiment, the second embodiment, and the third embodiment is represented by the same numerals and symbols.

A shielding board 86 is provided to a tip of the access cover 75. When the access cover 75 is closed, the shielding board 86 covers the window 53, and when the access cover 75 is opened, the shielding board 86 is separated from the window 53 to open the window 53. Because the shielding board 86 and the access cover 75 are integrally formed, the cost of the entire apparatus is low.

According to the embodiments mentioned above, in the image input/output apparatus having the scanner unit disposed at the upper stage of the apparatus body and the liquid jet recording unit installed at the lower stage of the apparatus body, the window which light passes or passes through is disposed between the scanner unit and the liquid jet recording unit mentioned above. When the operator selects the maintenance mode of the liquid jet recording unit in carrying out the exchange work of the recording liquid tank cartridge or the liquid jet recording head, or the removal work of the recording medium jammed in the conveyance section, the light source mounted on the image reading section of the scanner unit irradiates, the luminous flux emitted by the exposure passes or passes through the window, enters the inside of the liquid jet recording unit, and irradiates the maintenance region. Therefore, the periphery of the maintenance region is not shadowed by the hand of the operator and the workability of the operator is remarkably improved.

In addition, according to the embodiments mentioned above, the light source mounted on the image reading section to read the image information of the original placed on the platen also serves as the light source for illuminating the maintenance region. Therefore, it is not necessary to provide a dedicated light source for illuminating the maintenance region, and the periphery of the maintenance region can be illuminated using a simple and a low-cost configuration.

Further, according to the above embodiment, the light shielding member which retracts from the window is disposed. Accordingly, when the print waiting mode for the liquid jet recording unit is selected, the window is covered and the maintenance mode of the liquid jet recording unit is selected, the window is covered with the light shielding member during the print operation of the liquid jet recording unit. Therefore, it is possible to prevent decrease of an exposure amount irradiating the maintenance region, which occurs due to adhesion to the window of the recording liquid mist stirred up within the liquid jet recording unit along with jetting of the droplets.

In addition, according to the above embodiment, a setting is made such that, if the maintenance mode of the liquid jet recording unit is selected and a prescribed period of time has passed after the exposure by the linear light source is started, the light source is automatically extinguished (namely, providing the automatic shut off function). In this setting continuous exposure time by the light source can be restricted; and therefore waste of the power consumption can be prevented. Also, it is possible to extend the life of the light source.

Note that instead of the inkjet printer, an electrophotographic recording unit such as a laser printer may be used as the recording unit.

Besides, the above embodiment is an example of a method of controlling the image input/output apparatus that has the scanner unit disposed at the upper stage of the apparatus body and the recording unit installed at the lower stage of the apparatus body. This method includes the steps of: controlling the exposure effected by the irradiating light source which illuminates the original platen when the maintenance mode of the recording unit is selected, and irradiating the inside of the recording unit with the luminous flux emitted from the light source which passes or passes through the window disposed between the scanner unit and the recording unit.

Besides, the above embodiment is an example of a program for controlling the image input/output apparatus that has the scanner unit disposed at the upper stage of the apparatus body and the recording unit installed at the lower stage of the apparatus body. This program causes a computer to execute the processes of: controlling the exposure effected by the irradiating light source which illuminates the original platen when the maintenance mode of the recording unit is selected; and irradiating the inside of the recording unit with the luminous flux emitted from the light source which passes or passes through the window disposed between the scanner unit and the recording unit.

The present invention can be applied to the apparatus such as a printer, copying machine, or a facsimile machine, capable of inputting and outputting the image, and further, to an industrial recording apparatus which is complicatedly combined with various kinds of processing apparatus in a compound manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2004-318140 filed Nov. 1, 2004, which is hereby incorporated by reference herein in its entirety.

What is claimed is:

1. An image input/output apparatus comprising:
an apparatus body having upper and lower stages;
a scanner unit disposed at the upper stage of the apparatus body, the scanner unit including:
an original platen;
a light source operable to illuminate the original platen with a luminous flux;
a recording unit provided at the lower stage of the apparatus body, wherein the recording unit includes a maintenance mode;
a window provided so as to allow light to pass through between the scanner unit and the recording unit;
an exposure control unit configured to control the light source to illuminate the original platen in the case of the recording unit being in the maintenance mode; and
an irradiation unit configured to irradiate an inside of the recording unit with the luminous flux emitted from the light source passing through the window.

2. An image input/output apparatus according to claim 1, wherein the recording unit includes a liquid jet recording head, and wherein the irradiation unit irradiates a periphery of the recording head.

3. An image input/output apparatus according to claim 2, further comprising:
a reflection section configured to guide the luminous flux emitted by the light source so that the luminous flux passes through the window and irradiates the periphery of the liquid jet recording head.

4. An image input/output apparatus according to claim 3, wherein the reflection section is disposed inside the scanner unit.

5. An image input/output apparatus according to claim 4, wherein the reflection section has a reflection ratio of 80% or more.

6. An image input/output apparatus according to claim 4, wherein the scanner unit includes a housing and an original platen cover configured to press an original against the original platen, and wherein the reflection section is formed integrally with one of the housing and the original platen cover.

7. An image input/output apparatus according to claim 2, wherein the scanner unit includes an image reading section having a retreat state, wherein the luminous flux emitted by the light source passes through the window and irradiates the periphery of the liquid jet recording head.

8. An image input/output apparatus according to claim 2, wherein the light source stops illuminating luminous flux responsive to the recording unit canceling the maintenance mode.

9. An image input/output apparatus according to claim 2, further comprising:
the recording unit including a print waiting mode; and
a light shielding unit configured to shield the luminous flux so that the luminous flux emitted by the light source does not pass through the window responsive to the recording unit being in the print waiting mode.

10. An image input/output apparatus according to claim 2, further comprising an access cover having a closed position; and a shielding plate disposed on the access cover, wherein the shielding plate advances to cover the window responsive to the access cover being in a closed position and the recording unit canceling the maintenance mode.

11. An image input/output apparatus according to claim 2, further comprising a shielding member configured to advance into and retract from the window, the shielding member being provided inside the recording unit,
wherein the shielding member advances to cover the window responsive to the recording unit being in the print waiting mode, and the shielding member retracts to open the window responsive to the recording unit being in the maintenance mode.

12. An image input/output apparatus according to claim 11, wherein the shielding member advances into or retracts from the window in interlock with one of an operation of advancing or retracting the scanner unit into or from the recording unit, and an operation of opening and closing the access cover provided on the recording unit.

13. An image input/output apparatus according to claim 2, wherein the light source stops illuminating the luminous flux responsive to the recording unit being in the maintenance mode and a prescribed period of time passes after a start of illumination by the light source.

14. A method of controlling an image input/output apparatus having a scanner unit disposed at an upper stage of an apparatus body and a recording unit installed at a lower stage of the apparatus body, comprising the steps of:
controlling an exposure by an irradiating light source which illuminates an original platen when a maintenance mode of the recording unit is selected; and
irradiating an inside of the recording unit with a luminous flux emitted from the light source which passes through a window disposed between the scanner unit and the recording unit.

* * * * *